Patented Apr. 3, 1951

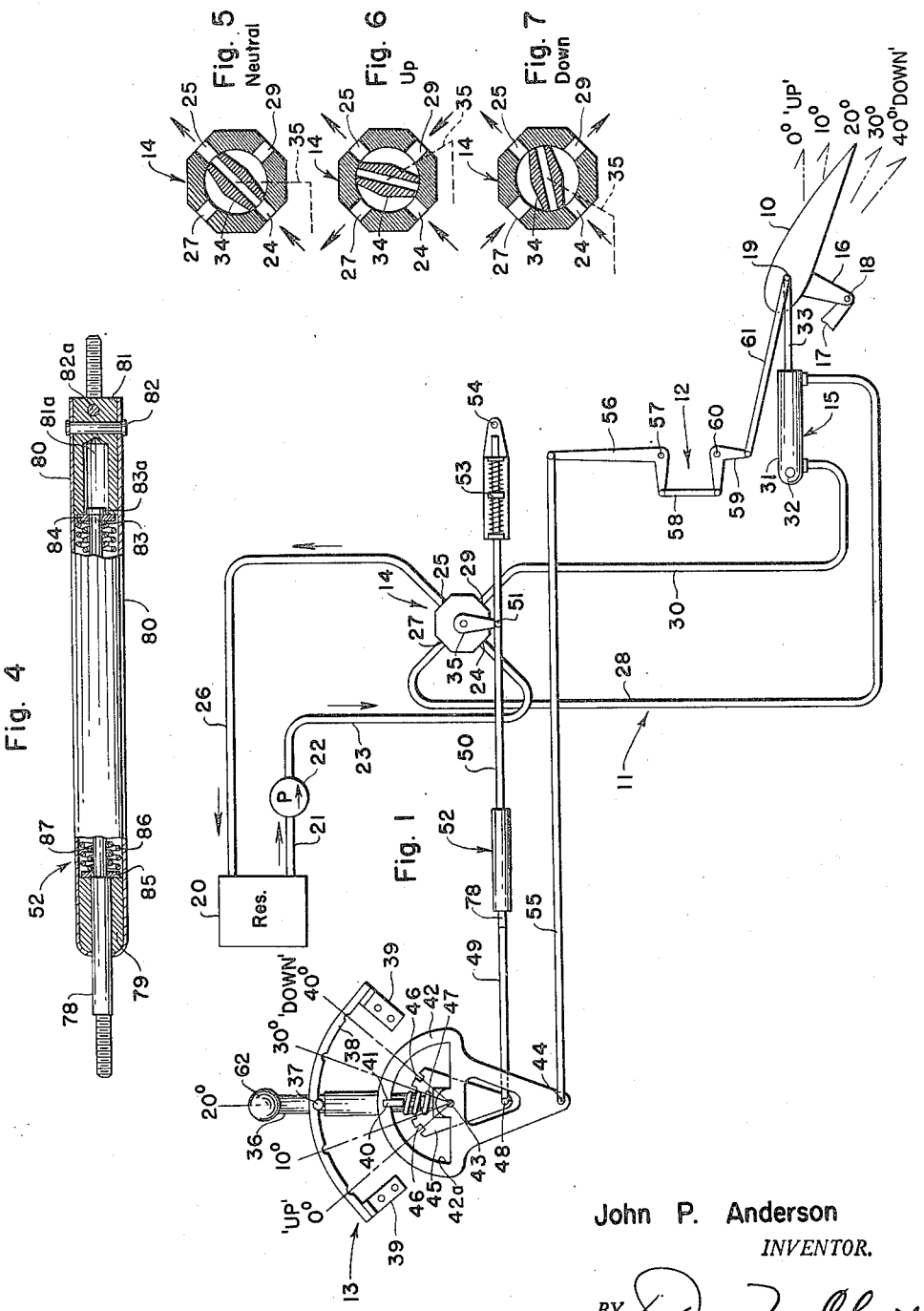

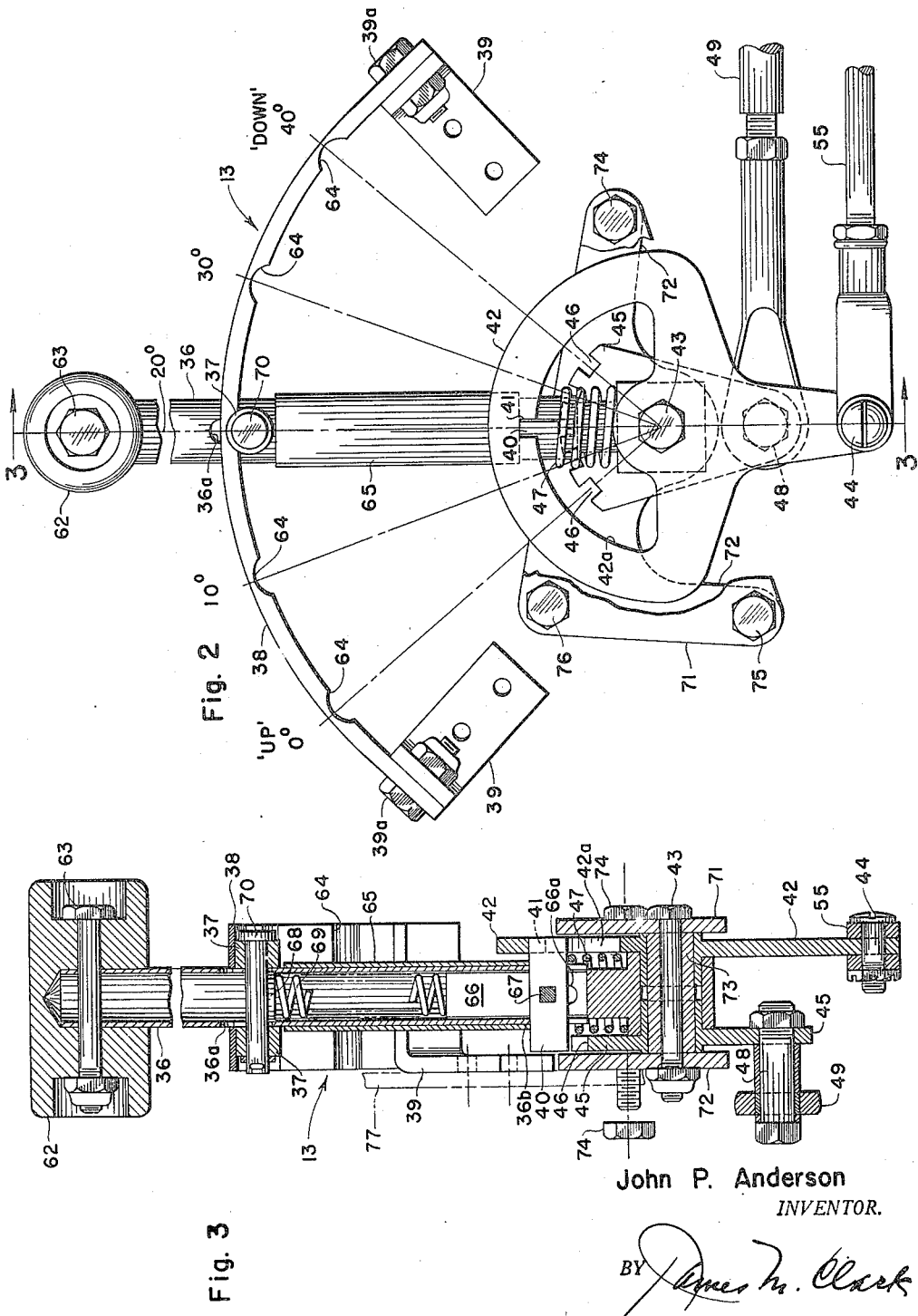

2,547,552

UNITED STATES PATENT OFFICE 2,547,552

AUTOMATIC HYDRAULIC-MECHANICAL FOLLOW-UP CONTROL SYSTEM

John P. Anderson, Fernwood, Calif., assignor to North American Aviation, Inc.

Application May 11, 1948, Serial No. 26,353

11 Claims. (Cl. 121—41)

The present invention relates to remote control systems and more particularly to improvements in follow-up controls of the hydraulic-mechanical type.

In remote control systems, and particularly in aircraft, it is frequently desirable to position a remote element, or surface, by means of a manually controlled hydraulic motor with relatively high boost, or mechanical advantage, in order that a large element can be readily moved by the application of relatively small manual control forces. It is also desirable in such installations to follow-up the displacement or movement of the movable element and when the element has been properly positioned to retain the same by suitable mechanical means while the hydraulic portion of the system is relieved of the necessity of maintaining further high fluid pressures or power-consuming work in order to hold the element in the desired position. The present invention is accordingly directed to the provision of an improved remote control system which utilizes a pre-selected handle position control with an automatic shut-off of hydraulic power to the fluid motor unit when the pre-selected position of the control is reached; and further to automatically return the hydraulic selector valve to its neutral position to thereby allow free circulation of the fluid in the pump portion of the hydraulic system. The present invention is directed to improvements in such control systems and includes in addition to the hydraulic and mechanical follow-up assemblies an improved manual control mechanism and its interconnection with the hydraulic selector valve for the control of the hydraulic motor and its cooperative operation with the mechanical portions of the system.

It is, accordingly, a major object of the present invention to provide an improved follow-up system for the remote control of a movable element. A further objective resides in the provision of an improved hydraulic-mechanical follow-up arrangement in which the advantages of the hydraulic system are utilized to increase relatively small pilot control forces to a sufficient extent to move the controlled element into its displaced position. A further object resides in providing a mechanical follow-up assembly which is interconnected with the manual control mechanism and the hydraulic selector valve in an improved manner which simplifies the manual operation by a fool-proof and easily operated mechanism.

It is a further object of this invention to provide a control system which utilizes a pre-selected handle position control with an automatic shut-off of hydraulic power to the operated unit when the pre-selected position is reached. It is a corollary objective to return the hydraulic selector valve to its neutral position after the pre-selected position is reached, to thereby allow free circulation of the pressure fluid within that portion of the hydraulic system which by-passes the fluid motor.

It is a further object of the present invention to provide an improved interconnection between the manually controlled mechanism and the hydraulic selector valve of the hydraulic system in which the interconnection includes both centering and lost-motion means to insure proper concurrent operation of the control mechanism and the valve. It is a still further object to provide an improved hydraulic-mechanical follow-up installation for use with a hydraulic system of the open center type. Other objects and advantages of the present invention will become obvious to those skilled in the art after reading the following description taken together with the accompanying drawings, in which:

Fig. 1 is a diagrammatic view of the improved hydraulic-mechanical follow-up system as applied to the operation of an aircraft flap;

Fig. 2 is an enlarged elevational view of the manually controlled mechanism utilized in the system shown in Fig. 1;

Fig. 3 is a cross-sectional view of the mechanism shown in Fig. 2 as taken along the lines 3—3 thereof;

Fig. 4 is a detailed view, partly broken away, of the lost-motion means utilized in the system of Fig. 1; and Figs. 5, 6, and 7 are diagrammatic views of the several operating positions of the hydraulic selector valve used in the system shown in Fig. 1.

Referring now to Fig. 1, the numeral 10 denotes a flap or other movable surface which may be pivotally or otherwise movably mounted adjacent the trailing edge of an aircraft wing. The flap 10 is arranged to be hydraulically actuated by the hydraulic system generally indicated by the numeral 11 and, by means of a mechanical follow-up system 12, the flap operating control 13 is arranged to return the hydraulic selector valve 14 to its neutral position and to mechanically retain the adjusted position of the flap 10, with the fluid motor indicated at 15. While a wing flap 10 has been selected for explanatory purposes, it will be understood that the improved system and parts are also adapted for use with other displaceable elements. The flap is shown in this figure deflected to 20° and the present modification is based upon a five-position flap which may be adjusted into its "up" or fully retracted position; its 10°; its 20° or "half-down" position as shown; its 30°; and its 40° "down," or fully extended position. The positions of adjustment other than the full line 20° position shown in Fig. 1, are also shown in this figure by broken lines, and it will be understood that the present invention is equally applicable to flaps or other movable surfaces which may be adjusted into more or less positions and angles than are shown and described herein.

The flap 10 is provided with an arm or horn 16 which is pivotally attached to the wing bracket 17 by the pivot 18. The flap 10 is also provided with a pivot 19 to which is connected the hydraulic motor or actuating means 15 and the mechanical follow-up means 12 to be more fully described below. The hydraulic actuating system 11 comprises essentially the manual control mechanism 13, the selector valve 14 and the actuating motor 15, and includes in addition, a reservoir or tank 20 having an outlet conduit 21 to the pump 22 which discharges into the pressure line 23 terminating in the port 24 in the selector valve 14, shown in greater detail in Figs. 5, 6 and 7. With the valve 14 in its central or neutral position as shown in Fig. 1, corresponding to the position of its movable element as shown in Fig. 5, the fluid pressure discharged through the line 23 and the port 24 passes through the open center of the valve, through the opposite port 25 and the return line 26, through which it is returned to the reservoir 20. The present hydraulic system is generally known as an "open center," or "open neutral," hydraulic system for this reason.

The selector valve 14 is provided with a port 29 in communication with the "down" pressure line 30 extending to the actuating motor 15 and the valve 14 is also provided with a further opposite port 27 which is in communication with the "up" pressure line 28, connected to the opposite end of the cylinder of the fluid actuator motor 15. This actuating motor consists of a cylinder portion 31 which is pivotally mounted upon the aircraft structure at 32 and has reciprocable therein the piston 33 which is pivotally connected at its outer terminal to the aforementioned flap actuating pivot 19. The selector valve 14 is provided with an internal ported plug or movable element 34 which is fixedly attached to the external arm 35 by which it is rotated for selective control of fluid to either end of the fluid motor 15.

The control mechanism 13 includes essentially a handle or lever 36 carrying a control detent 37 selectively engageable with any of the positions in the notched detent plate 38 which is suitably attached to adjacent supporting structure, 77 in Fig. 3, by the brackets 39 disposed at each end of the arcuate plate 38. The control lever 36 also carries a pawl 40 engageable with the notch or detent 41 in the arcuate follow-up cam member 42 which is pivotally mounted upon the adjacent supporting structure by the pivot bolt 43. The follow-up cam 42 has a downwardly depending lever portion terminating in the pivot 44 by which the manual control mechanism 13 is interconnected mechanically, through the follow-up mechanism 12, with the flap 10 at the pivot 19.

A ratchet element 45 is co-axially mounted upon the same pivot 43 as is the lower terminal of the control lever 36 and the follow-up cam member 42. The upper arcuate edge of the ratchet member 45 is provided with a plurality of teeth, and detent recess portions 46 corresponding to the angular arrangement of the recesses in the detent plate 38. A compression coil spring 47 is disposed about the base portion of the control lever 36 and serves to urge the pawl 40 upwardly at all times either against the arcuate edge 42a of the cam member 42 or its notch 41. The lower or depending portion of the ratchet member 45 is pivotally connected at 48 to the push-pull rods 49 and 50, by which the ratchet member controls the selector valve 14, to which the rod 50 is connected at the pivot 51.

Between the push-pull rod members 49 and 50, there is disposed a bungee or lost-motion member 52 which is a spring or other resilient device designed to transmit predetermined forces through the rod members 49 and 50, and to permit partial telescoping or extension of the lost-motion device when the valve 14 is moved to one of its limiting stops prior to completion of the movement of the ratchet member 45. This lost-motion device 52 will be described in greater detail in connection with the description of the showing of the device in Fig. 4. At the opposite terminal of the rod 50, there is provided a resilient centering device 53 which is pivotally mounted upon suitable supporting structure at the pivot 54. This centering device has the effect of automatically returning the movable element 34 of the selector valve 14, as well as its operating lever 35, to their neutral central positions whenever controlled movements of the ratchet member 45 are completed and the holding forces removed therefrom by release of the detent 40.

The mechanical follow-up assembly 12 comprises a push-pull rod 55 which is pivotally connected at one terminal to the depending portion of the follow-up cam 42 by means of the pivot 44. The opposite end of this rod 55 is pivotally connected to a bell-crank lever 56 which is mounted for pivotation about the pivot 57. The remaining arm of the bellcrank lever 56 is pivotally attached to a link 58 which in turn is pivotally connected at its opposite terminal to an arm of a further bellcrank 59 pivotally mounted at the pivot 60. The remaining arm of the bellcrank 59 is pivotally connected to a push-pull rod 61 which is pivotally connected at its opposite terminal to the above mentioned pivot 19 on the flap 10, at which the piston 33 of the hydraulic actuating motor 15 is also pivotally attached.

Figs. 2 and 3 show in detail the elements which comprise the manual control mechanism 13, which has been shown in Fig. 1, and its more essential elements described in connection therewith. The upper end of the tubular control handle 36 is provided with a knob or grip portion 62 which is attached to the handle by the through bolt 63. The tubular handle 36 is provided with a pair of slots 36a through its opposite wall portions adjacent the above mentioned detent rollers 37, which are mounted for rotation about the pivot pin 70 past which the lever is permitted to move downwardly by means of these slots 36a. This overrunning downward movement of the lever 36, which is necessary to move the pawl 40 downwardly from engagement with the cam member 42, to engagement with the ratchet member 45, also permits the rollers 37 to remain engaged with the respective arcuate detent or notch 64 in the lower surface of the detent plate 38.

The lower portion of the lever 36 is externally reinforced by the tube 65 which extends down to the upper end of a slot 36b in the tube 36 to permit vertical movement of the pawl 40. Within the lower end of the tubular lever 36, there is disposed a bearing block 66 having a lower apertured hub portion which is rotatably mounted concentrically about the main pivot bolt 43. The upper portion of the bearing block 66 is transversely slotted to permit vertical movement of the pawl 40. The latter is provided with a fixedly attached square pin 67 which extends through the pawl across the space between the two divided upper portions of the bearing block 66, which is also provided with a slot 66a in each side within which the extended pin portions 67 are permitted to move vertically along the central axis of the lever 36, while at the same time being prevented from lateral or rotational movements as viewed in Fig. 3. Beneath the pin 70 about which the rollers 37 rotate, there is disposed a washer 68, and a compression spring 69 is disposed within the inner tubular lever 36 for resiliently urging the bearing block 66 downwardly, while at the same time urging the washer 68 and the detent roller assembly 37—70 upwardly into engagement with the detent plate 38.

Inasmuch as the bearing block 66 is maintained in its downward fixed position by rotational engagement with the hub assembly about the pivot 43, the spring 69 can only act or extend in the upward direction and accordingly resiliently maintains the rollers 37 within the desired detent recess 64 from which they may be removed when the pawl 40 is pushed downwardly from engagement with the notch 41 of the cam member 42 by downward pressure on the grip knob 62, whereupon the rollers may be disengaged by fore or aft rotational movement of the handle 36 about the pivot 43. Similarly it will be noted that the pawl 40 may be disengaged from the notch 41 in the segment 42 by downward axial movement of the lever 36 toward the pin 43 whereby the pawl 40 engages one of the notches 46 in the ratchet 45 without disengagement of the rollers 37 from the detent plate 38.

The manual control mechanism 13, as shown in Figs. 2 and 3, is supported upon the adjacent structural framework 77 by means of the bolts 74, 75 and 76 and the two triangular-shaped fixed plates 71 and 72, through the corners of which the through-bolts 74, 75 and 76 are passed to clamp the assembly together. As indicated in the sectional elevation in Fig. 3, these through-bolts pass through the plate elements 71 and 72 and as shown in this figure in the case of the bolt 74, they also pass through the plate 77 of the adjacent supporting framework. A bushing 73 is concentrically disposed about the pivot pin 43, being clamped thereby between the plates 71 and 72, and forms a bearing for the hub portions of the cam member 42 and the ratchet member 45, about which hub portions the base block or hub portion 66 of the control lever 36 is also adapted to rotate.

Referring now to the lost-motion device 52 which is shown in detail in Fig. 4, the numeral 78 indicates a terminal rod which is threadedly connected to the push-pull rod 49 and extends through the adjacent guide block portion 79 of the device. The lost-motion device 52 is housed within a casing portion 80 which is plugged at its opposite end by a further guide block 81 which also has a threaded terminal portion extending therefrom for attachment to the push-pull rod 50. The casing or shell 80 is attached to the terminal block 81 by means of the through-rivets or pins 82 and 82a and the block is provided with a recess or guide portion 81a. The rod end 78 has a reduced diameter portion 83 terminating in a head portion 83a and at the ends of the reduced portion 83 are disposed washers or abutment elements 84 and 85. Disposed between these abutment washers are two compression springs 86 and 87 coaxially arranged about the reduced portion 83 and adapted to resiliently oppose either telescoping of the rod 78 within the casing 80, or extension of the rod 78 from within the casing.

In other words, as a force toward the right in Figs. 1 and 4 is applied to the rod 78, the entire push-pull assembly 49—50—52 will move to the right as a fixed length unit, moving the valve arm 35 until its limit stop (not shown) is reached. In those adjustments of the manual control mechanism 13 where it is necessary to rotate the ratchet member 45 beyond the throw or rotational movement of the valve elements 34 and 35, the resistance offered by the valve stop will cause the rod 78 to compress the springs 86 and 87, and to telescope within the casing 80 to the extent of the excess, or over-movement, of the control mechanism with respect to the selector valve throw. When the ratchet member 45 is, however, again released, the centering mechanism 53 will restore the valve to its neutral central position and the compression in the springs 86 and 87 will cause extension of the rod element 78, and return of the ratchet member 45 to its neutral position, to restore the original length of the push-pull rod assembly 49—50—52.

The operation of the hydro-mechanical follow-up system shown in Fig. 1 is as follows:

Let it be assumed that it is desired to move the flap 10 to its 0° or "up" position from the "half-down" or 20° position shown in this figure. With the control lever 36 in its 20° or "half-down" position as shown in Fig. 1, and in the central or neutral position of the valve arm 35, the movable element 34 and its relationship to the ports of the valve 14 are shown in the neutral position of Fig. 5. In this figure, it will be noted that the pressure line 23 from the pump 22 enters the valve port 24 and passes through the center element 34 and out through the port 25 into the return line 26 and back into the reservoir 20. The position of the central plug element 34 interrupts any flow from the port 27 to the port 29, or vice versa, and the hydraulic motor 15 is hydraulically locked in the position shown by the inability of its piston to displace fluid into either conduit 28 or 30. The knob 62 is depressed and the control lever 36 is permitted to be moved forward as the pawl 40 is moved down out of the notch 41 in the pivoted element 42. As the pawl 40 is moved down toward the pivot axis 43, it engages one of the recesses 46 in the second pivotal ratchet element 45 which is connected to the control lever 35 of the selector valve 14. The control lever 36 is then pushed forward past the 10° setting to the 0° or full "up" setting. As the lever 36 is initially moved forward, the pawl 40 is maintained in the tooth recess 46 by the lower edge 42a of the arcuate cam member 42, and this forward movement of the lever and its attached pawl 40 causes the ratchet element 45 to rotate in the same counterclockwise direction about its pivot axis 43. This rotational movement of the ratchet element 45 causes translation of the push-pull rod assembly 49—50 rearwardly to the right and imparts concurrent counterclockwise movement to the control lever 35 of the valve 14.

As the aforementioned forward movement of the control lever 36 and its attached pawl 40 is made to the 0° or "up" position, the lever 35 of the valve 14 is moved in the counterclockwise direction until the stops (not shown) on the valve 14 are reached, and the internal element 34 of this valve assumes the position shown in the "up" condition of Fig. 6. In the event the valve stops are reached before the lever 36 can be moved through its full forward movement in which the roller detents 37 engage the forward notch 64 in the detent plate 38, the excess movement of the push-pull rod 49 is absorbed by the lost-motion device 52. This is permitted by the partial compacting or telescoping of the element 78 as it moves forward into the recess 81a of the end block element 83 and compresses the springs 86 and 87 to the required extent.

Referring now to Fig. 6, it will be noted that the movable valve element 34 has been rotated in the clockwise direction into the position in which the passage through the element is cut off by the walls of the body of the valve and the ports 24 and 27 are placed in communication with each other. With the parts of the valve 14 in this "up" position as shown in Fig. 6, the fluid pressure within the conduit 23 enters the port 24 and passes out through the port 27 into the "up" pressure line 28 and thence into the outer end of the cylinder 31 of the hydraulic motor 15 causing the piston to be drawn into the cylinder toward the pivot 32 and imparting similar movement to the flap 10, causing it to rotate upwardly about its pivot 18. The fluid displaced from the forward end of the cylinder is discharged through the conduit 30, the ports 29 and 25, and thence through the return line 26 back to the reservoir 20.

Returning now to the manual control mechanism 13, it will be recalled that as the pawl 40 was pushed downwardly out of engagement with the notch 41 of the cam member 42, the latter was permitted to remain in the position shown in Fig. 1, as the control lever 36 and the now engaged ratchet element 45 were rotated in the counterclockwise direction about the pivot 43. As the flap 10, however, moves upwardly and forwardly about its pivot, the connected follow-up linkage 55 to 61 inclusive, is caused to be operated and this forward upward movement of the flap imparts counterclockwise rotation to the cam member 42 about the same pivot 43. It will therefore be seen that both of the elements 42 and 45 are rotated about the pivot 43 in the same direction, with the positive pilot controlled forward movement of the ratchet member 45 preceding the follow-up movement of the cam member 42.

It will be recalled that the ratchet member 45 is moved forward manually by the like movement of the control lever 36 due to its engagement of its pawl 40 and once the latter is released downwardly from its detent 41, it rides forwardly against the inner edge 42a of the arcuate cam member 42, under the influence of the spring 47. As the cam member 42 is, however, caused to follow-up the movement of the ratchet 45 as the result of the mechanical follow-up linkage 12, the detent notch 41 again overtakes the pawl 40 at the forward "up" or 0° position, and the pawl again is caused to move upwardly away from the pivot axis 43 out of the notch 46 in the ratchet 45 and into the notch 41 in the cam member 42. As the pawl 49 is caused to move out of the notch 46 under the influence of the spring 47, the ratchet member 45 is placed under the influence of the resilient centering device 53, which returns the valve lever 35 to the initial neutral position as shown in Figs. 1 and 5. This rotation of the movable central element 34 of the valve 14 back to the neutral position shuts off the flow into the "up" pressure conduit 28, as well as any return flow through the conduit 30, and the pressure from the line 23 passes through the open center of the valve 14 to be returned directly through the conduit 26 to the reservoir 20. In this neutral position of the valve 14, the flap 10 is accordingly hydraulically locked in its "up" position and the follow-up mechanism also serves to mechanically retain the flap in this position by virtue of the detent rollers 37 engaging the "up" notch 64 in the detent plate 38.

It will also be understood that by means of the system which has been shown and described the flap 10 can also be moved "up" from its 20° to its 10° position, and it is not necessary that movements from the "half-down" position be made all the way to its full "up" position. In order to move the flap up from the 20° to the 10° position, it is merely necessary to depress the knob 62 to release the pawl 40 from its detent 41 and engage the same in the ratchet 45, and to move the control lever 36 forwardly until the detent rollers engage the notch for the 10° position. As in the operation toward the full "up" position, the pawl 40 is maintained in engagement with the ratchet 45 by the cam member edge 42a and as the latter is caused to follow-up the movement of the ratchet member by the movement transmitted through the mechanical follow-up linkage as the flap is moved upwardly, the pawl 40, which is continually urged outwardly away from the pivot 43 by the spring 47, is caused to move into and engage the notch 41 as the cam member reaches the 10° position. At this position, the ratchet member 45 is released from the manual restraint and the restraint offered by the detent rollers 37 within the 10° notch in the detent plate 38 and this ratchet member is again free to restore the lever arm 35 of the valve 14 to its neutral position under the influence of the centering device 53. As this occurs, the actuating pressure from the line 23 is cut off and no further movement of the flap by the hydraulic motor 15 occurs. The flap 10 is accordingly retained in this 10° position, both by the hydraulic locking effect of the blocking action of the element 34 of the valve 14, as well as by the restraint offered by the detent rollers 37 in the notches of the detent plate 38 exerted through the engaged pawl and detent assembly 40—41 holding the cam member 42 and the mechanical linkage 12 fixed in this 10° position.

The reverse movement of the flap is similarly accomplished by the reversal of the movement of the control lever 36 and the operation of the respective elements and their functions are the same as in the foregoing operation. From any position of the flap 10, it is merely necessary for the pilot or operator to depress the control knob 62 to disengage the pawl 40 from its detent 41, and to engage the opposite tooth in the ratchet member 45, and by swinging or rotational movement of the control lever 36 to the desired setting on the arcuate detent plate 38 it will be seen that the ratchet causes the valve to operate in the required direction to permit flow to the fluid motor in the proper direction to move the flap into the desired position. As the pawl 40 is moved with the lever 36 and the ratchet 45, the cam member 42 is momentarily left behind until the flap moves sufficiently to cause the follow-up linkage 12 to cause the cam member 42 to follow and permit the pawl to drop back into its detent 41 under the influence of the spring 47. In each step or operation it will be noted, as explained above, that movement of the control lever 36 from one detent setting to the next in the "up" direction, is sufficient to impart the required full angular movement to the valve arm 35 and the movable element 34 to cause the passageway in the movable element to be cut off and to place ports 24 and 27, and ports 29 and 25 in communication respectively. When moved in the "down" direction the ports 24 and 29, and ports 27 and 25 are placed in communication. It will also be noted that where it may be necessary to move the control lever 36 from one extreme position to the other the excess, or overtravel, of the movement transmitted by the ratchet 45 and its push-pull rod 49 beyond the rotational angular movement of the arm 35, as permitted by the stops of the valve 14, is absorbed by the lost-motion or overriding device 52. As the ratchet member 45 is again released by outward movement of the pawl 40, the springs 86 and 87 in the device 52 again restore the push-pull rod assembly 49—50 to its original length; and as the valve arm 35 is restored by the centering assembly 53, to its central neutral position, as shown in Fig. 1, the ratchet member 45 is also returned to its central position as shown in this figure.

Other forms and modifications of the present invention, both with respect to its general arrangement and the details of its respective parts, are intended to come within the scope and spirit of the present invention as more particularly defined in the appended claims.

I claim:

1. A remote control system comprising a controlled member movably mounted upon a supporting structure, a source of fluid pressure, a hydraulic motor operatively connected to said controlled member, a spring-biased valve, conduit means connecting said source of fluid pressure to said valve and to said hydraulic motor, manual control mechanism including a pivotally mounted notched element operatively connected to said controlled member, a pivotally mounted ratchet element operatively connected to said valve, and manually-actuatable pawl means alternately engageable with said ratchet element and said notched element arranged for its automatic release from said ratchet element and its engagement with said notched element to permit said valve to return to its initial position under the influence of said spring-biasing for stopping said hydraulic motor at a predetermined position.

2. In a remote control system, a movably mounted member, a source of fluid pressure, a hydraulic motor operatively connected to said movable member and in fluid communication with said pressure source, a valve in fluid communication with said pressure source and said hydraulic motor, biasing means for returning said valve to its neutral position, a manual control assembly including a control lever movable about a pivot, a pair of notched elements rotatable about said control lever pivot, a pawl movably carried by said control lever arranged for alternate engagement with the notches of either of said pivoted elements, a first of said pivotally mounted elements operatively connected to said movable member, the second of said pivotally mounted elements operatively connected to said hydraulic valve, said pawl being manually operable to be disengaged from the first of said notched elements for engagement with the second said notched element for the manual actuation of said valve arranged in such manner that movement of said control lever adjusts said valve for the actuation of said pivotally mounted member by said hydraulic motor, and means for the automatic return of said pawl to engagement with said first notched element for mechanically retaining said adjusted position of said member.

3. In a follow-up control, a member pivotally mounted upon a structure, a hydraulic motor operatively connected to said member, a source of fluid pressure, a spring-biased valve, fluid conduits operatively connecting said fluid pressure source with said valve and with said hydraulic motor, a manual control mechanism including a shiftable pawl means operatively connected to said valve for the predetermined hydraulic positioning of said member, said manual control mechanism including a ratchet element engageable by said pawl means for the operative connection of said control mechanism with said selector valve, and follow-up mechanism including a notched element engageable by said pawl means operatively connected to said control mechanism and to said pivoted member arranged to automatically cut-off said fluid pressure flow to said hydraulic motor and said predetermined position of said member is retained by the shifting of said pawl means from said ratchet element to said notched element.

4. In a positioning system for a movable member; a movable member pivotally mounted upon a supporting structure; a hydraulic motor operatively connected to said movable member; a source of fluid pressure; a spring-biased valve for the control of said hydraulic motor; fluid conduits in communication with said fluid pressure source, said valve and said hydraulic motor; a manually shiftable pawl; and manual control means including a pawl-engageable ratchet element operatively connected to said valve and a pawl-engageable notched element operatively connected to said movable member arranged to hydraulically operate said movable member to a pre-selected position and to automatically stop said hydraulic operation when said pre-selected position of said movable member is reached by the shifting of the pawl from said ratchet element to said notched element.

5. In a follow-up control system, a controlled member pivotally mounted upon a supporting structure, a source of fluid pressure, a fluid motor operatively connected to said controlled member, a spring-biased valve in fluid communication with said fluid pressure source and said fluid motor, manual control mechanism including a shiftable pawl and a ratchet element engageable by said pawl operatively connected to said valve for the remote control of said controlled member, and mechanical means including a notched element engageable by said pawl for interconnecting said manual control mechanism with said controlled member arranged upon overtaking movement of said mechanical means with said mechanism and shifting of said pawl from said ratchet element to said notched element to automatically interrupt said fluid pressure flow when said controlled member has reached a predetermined position with respect to the supporting structure.

6. In a follow-up control system for the remote control of a movable member by a hydraulic motor, a source of fluid pressure for said motor, a spring-biased valve in fluid communication with said source of fluid pressure and said motor, a manual control mechanism including a lever carrying a spring-loaded pawl, a movable element having a notch engageable by said spring-loaded pawl, said movable element operatively connected to said movable member, a ratchet element selectively engageable by said pawl by manual force overcoming said spring loading, said ratchet element operatively connected to said selector valve, said manual control mechanism arranged to pre-select the hydraulically actuated extent of movement of said movable member by positioning said valve and arranged to hydraulically lock said movable member in said predetermined position upon engagement of said movable element notch by said pawl and disengagement of said pawl from said ratchet-connected valve.

7. In a follow-up control system for the remote control of a movable member by a hydraulic motor, a source of fluid pressure for said motor, a valve in fluid communication with said source of fluid pressure and said motor, a manual control mechanism including a lever carrying a spring-loaded pawl, a movable element having a notch engageable by said spring-loaded pawl, said movable element operatively connected to said movable member, a ratchet element selectively engageable by said pawl by manual force overcoming said spring loading, said ratchet element operatively connected to said valve, said manual control mechanism arranged to pre-select the hydraulically actuated extent of movement of said movable member by the positioning of said valve and to hydraulically lock said movable member in said predetermined position upon engagement of said movable element notch by said pawl and the disengagement of said pawl from said ratchet-connected valve, and resilient means arranged to restore said valve to its neutral position in which said fluid pressure is permitted to circulate through said valve and the flow to said fluid motor is blocked in each direction.

8. A remote control system comprising a controlled member movably mounted upon a supporting structure, a source of fluid pressure, a hydraulic motor operatively connected to said controlled member, a spring-biased valve, conduit means connecting said source of fluid pressure to said valve and to said hydraulic motor, manual control mechanism including a notched element operatively connected to said controlled member, a pivotally mounted ratchet element operatively connected to said valve, said notched element and said ratchet element mounted for independent pivotation about a common axis, and manually-actuatable pawl means alternately engageable with said ratchet element and with said notched element arranged for automatic release from said ratchet element and its engagement with said notched element to permit said valve to return under the influence of said spring-biasing to its initial position for stopping said hydraulic motor at a predetermined position.

9. A remote control system comprising a controlled member movably mounted upon a supporting structure, a source of fluid pressure, a hydraulic motor operatively connected to said controlled member, a spring-biased valve, conduit means connecting said source of fluid pressure to said valve and to said hydraulic motor, manual control mechanism including a pivotally mounted notched element operatively connected to said controlled member, a pivotally mounted ratchet element operatively connected to said valve, and manually actuatable pawl means mounted for pivotal movement about an axis coaxial with the axes of pivotal mounting of both said elements alternately engageable with said ratchet element and said notched element arranged for its automatic release from said ratchet element and its engagement with said notched element to permit said valve to return to its initial position under the influence of said spring-biasing for stopping said hydraulic motor at a predetermined position.

10. A remote control system comprising a controlled member movably mounted upon a supporting structure, a source of fluid pressure, a hydraulic motor operatively connected to said controlled member, a spring-biased valve, conduit means connecting said source of fluid pressure to said valve and to said hydraulic motor, manual control mechanism including a pivotally mounted notched element operatively connected to said controlled member, a pivotally mounted ratchet element operatively connected to said valve, and manually actuatable pawl means alternately engageable with said ratchet element for the manual control of said valve and with said notched element arranged for its automatic release from said ratchet element and its engagement with said notched element to permit said valve to return to its initial position under the influence of said spring-biasing for stopping said hydraulic motor at a position determined by the position to which said notched element may be manually moved by said manually actuatable pawl means.

11. A remote control system comprising a controlled member movably mounted upon a supporting structure, a source of fluid pressure, a hydraulic motor operatively connected to said controlled member, a spring-biased valve, conduit means connecting said source of fluid pressure to said valve and to said hydraulic motor, manual control mechanism including a notched element operatively connected to said controlled member, a ratchet element operatively connected to said valve, said notched element and said ratchet element mounted for independent pivotation about a common axis, and manually actuatable pawl means alternately engageable with said ratchet element for manual control of said valve and with said notched element arranged for its automatic release from said ratchet element and its engagement with said notched element to permit said valve to return to its initial position under the influence of said spring-biasing for stopping said hydraulic motor at a position determined by the position to which said notched element may be manually moved by said manually actuatable pawl means.

JOHN P. ANDERSON.

REFERENCES CITED

The following references are of record in the file of this patent:

UNITED STATES PATENTS

| Number | Name | Date |
|---|---|---|
| 334,238 | King | Jan. 12, 1886 |
| 2,016,727 | Roth | Oct. 8, 1935 |
| 2,263,470 | Perkins | Nov. 18, 1941 |
| 2,286,256 | Brown | June 16, 1942 |
| 2,389,274 | Pearsall | Nov. 20, 1945 |
| 2,438,317 | Gabriel | Mar. 23, 1948 |
| 2,462,915 | Spielman | Mar. 1, 1949 |